United States Patent
Dremel et al.

(10) Patent No.: US 8,449,354 B2
(45) Date of Patent: May 28, 2013

(54) HARD FINISH MACHINE FOR HARD FINISHING OF A WORKPIECE

(75) Inventors: Ralf Dremel, Lichtenfels (DE); Frank Mueller, Wiesenfeld (DE); Thomas Schenk, Coburg (DE)

(73) Assignee: Kapp GmbH, Berlin (DE)

( * ) Notice: Subject to any disclaimer, the term of this patent is extended or adjusted under 35 U.S.C. 154(b) by 386 days.

(21) Appl. No.: 12/894,435

(22) Filed: Sep. 30, 2010

(65) Prior Publication Data

US 2011/0081845 A1 Apr. 7, 2011

(30) Foreign Application Priority Data

Oct. 1, 2009 (DE) .................. 10 2009 043 678

(51) Int. Cl.
*B24B 7/00* (2006.01)
*B24B 55/03* (2006.01)

(52) U.S. Cl.
USPC .................. 451/66; 451/47; 451/53; 451/253; 451/450

(58) Field of Classification Search
USPC ................ 409/65, 73, 78; 451/47, 53, 65, 66, 451/67, 253, 275, 449, 450
See application file for complete search history.

(56) References Cited

U.S. PATENT DOCUMENTS

| | | | |
|---|---|---|---|
| 2,924,873 A | 2/1960 | Knowles | |
| 3,905,161 A * | 9/1975 | Tomita et al. | 451/11 |
| 4,314,425 A * | 2/1982 | Bricker et al. | 451/450 |
| 4,508,274 A | 4/1985 | Eichfeld | |
| 4,961,289 A | 10/1990 | Sulzer | |
| 5,111,625 A * | 5/1992 | Simpfendorfer et al. | 451/450 |
| 5,882,247 A * | 3/1999 | Longuet et al. | 451/236 |
| 6,123,606 A * | 9/2000 | Hill et al. | 451/53 |
| 6,305,183 B1 * | 10/2001 | Mukai et al. | 62/376 |
| 6,921,321 B2 * | 7/2005 | Morita | 451/60 |
| 7,198,543 B2 * | 4/2007 | Yanase et al. | 451/5 |

FOREIGN PATENT DOCUMENTS

| | | |
|---|---|---|
| DE | 90013 | 12/1896 |
| DE | 41 26 928 A1 | 2/1993 |
| DE | 10 2006 009547 A1 | 8/2007 |

* cited by examiner

*Primary Examiner* — Timothy V Eley
(74) *Attorney, Agent, or Firm* — Lucas & Mercanti, LLP

(57) ABSTRACT

The invention relates to a hard finish machine (1) for hard finishing of a workpiece (2), comprising at least two different hard finish tools (3, 4) which are arranged on a tool spindle (5), wherein the tool spindle (5) is arranged movable in the direction (Y) of its axis (6) on a tool carrier (7), wherein the tool carrier (7) is translational movable relatively to a machine bed (8) and wherein the hard finish machine furthermore comprises cooling lubricant supplying means (9) for the supply of cooling lubricant to the machining region between the workpiece (2) and the hard finish tool (2, 3). To work in all possible tool and method combinations with optimized cooling lubricant supply conditions the invention proposes that the cooling lubricant supplying means (9) comprise at least one nozzle element (10), wherein the nozzle element (10) comprises a nozzle chamber (11), wherein the nozzle chamber (11) is limited by two facing wall elements (12, 13) which define a stream exit opening (14) for the cooling lubricant and wherein at least one of the wall elements (12, 13) is arranged movable for the variation of the stream exit opening (14).

12 Claims, 3 Drawing Sheets

HARD FINISH MACHINE FOR HARD FINISHING OF A WORKPIECE

Figure 1:
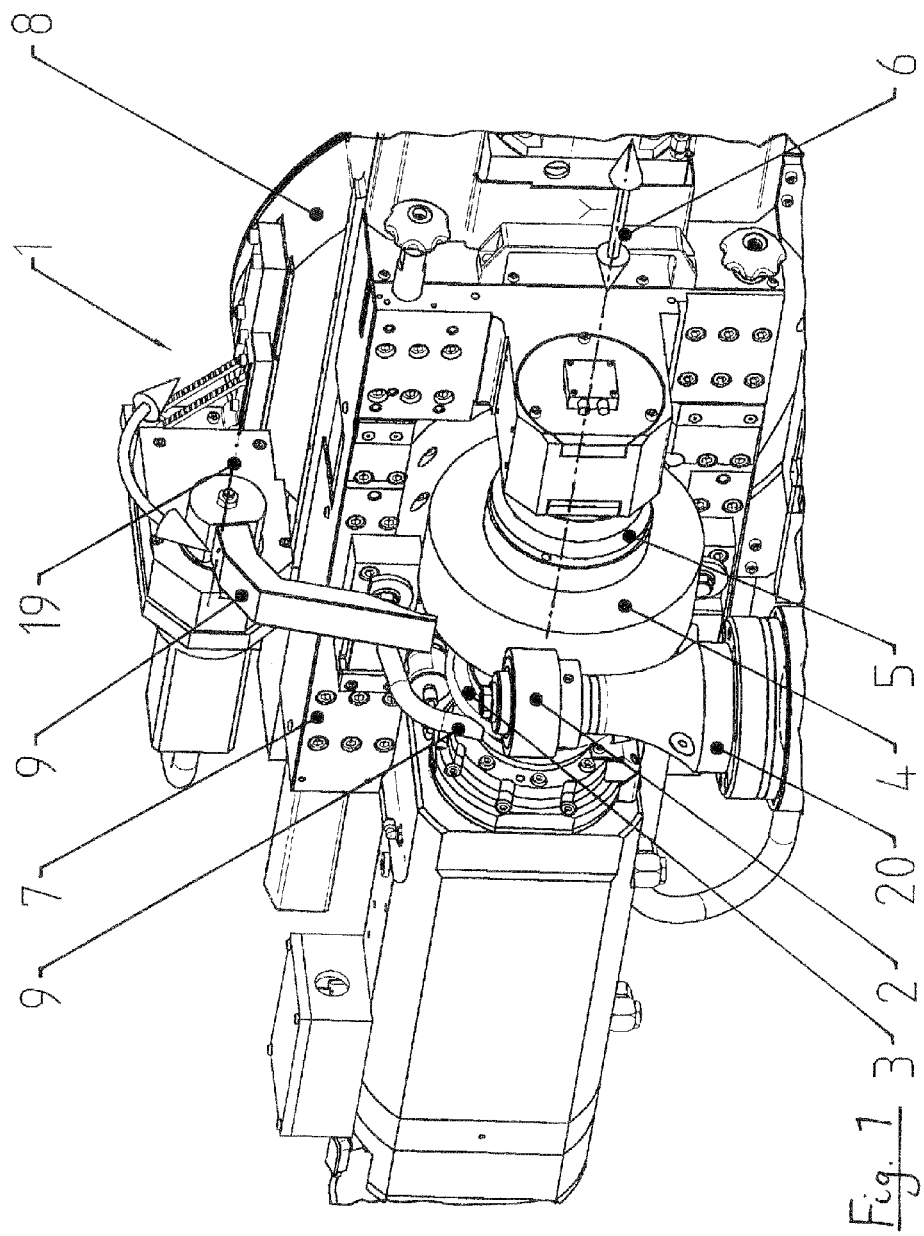

This application claims the priority of DE 10 2009 043 678.2 filed Oct. 1, 2009, which is incorporated by reference herein.

The invention relates to a hard finish machine for hard finishing of a workpiece, comprising at least two different hard finish tools which are arranged on a tool spindle, wherein the tool spindle is arranged movable in the direction of its axis on a tool carrier, wherein the tool carrier is translational movable relatively to a machine bed and wherein the hard finish machine furthermore comprises cooling lubricant supplying means for the supply of cooling lubricant to the machining region between the workpiece and the hard finish tool.

Such hard finish machines which are well known in the state of the art are employed e.g. in the production of gears as gear grinding machines. Often, a division of the stock is provided which has to be ground so that the gear is firstly rough machined and subsequently finish machined. For rough machining a grinding worm can be used, wherein the continuous generation grinding method is employed; the finish machining can take place with a profile grinding wheel using the profile grinding method.

In order to carry out the grinding process properly and to prevent especially thermal overload of the tooth flank a reliable supply of the contact area between the grinding tool and the workpiece must be ensured which takes place by the arrangement of cooling lubricant supply means.

For the two mentioned methods significant different demands with respect to the cooling lubricant supply exist in terms of a secure prevention of thermal damages of the workpiece:

When using the continuous generative grinding method usually cutting speeds, i.e. circumferential velocities of the grinding worm, of ca. 60 m/s and higher are used due to the connection between the cutting speed and the machining time. For a secure prevention of thermal damages of the workpiece peripheral zone a difference between the circumferential velocity of the grinding worm and the exit velocity of the stream of cooling lubricant being as small as possible is aimed for, i.e. a relatively high exit velocity of the cooling lubricant from the cooling lubricant nozzle is required. This high velocity is created by a small cross sectional area of the nozzle and a high supply pressure. Under such circumstances a relatively low volume flow rate is given which, however, has no negative influence to the grinding process or to the reached workpiece quality.

In contrast, when using the profile grinding method usually low cutting speeds between 25 and 35 m/s are employed. This method demands a secure coverage of the whole grinding wheel profile by the stream of cooling lubricant. Thereof the demand results for a relatively large cross sectional area of the nozzle depending on the respective profile width and height, wherein a stream of cooling lubricant having a low exit velocity and a low pressure results, but having a relatively high volume flow rate.

Beside the mentioned specific application of the hard finishing method of gears other general cases are possible in which several tools are employed one after the other with significant different demands to the cooling lubricant supply.

According to a usual manufacturing method in the case of several tools those tools are arranged flushing on a mandrel which is clamped between a spindle motor and a counter bearing. The whole unit consisting of spindle motor, counter bearing, mandrel and tools is arranged on a slide (tool carrier) movable in axial direction of the tools (mostly nominated as the "Y" axis) by which the tools can be brought into the axial position relatively to the workpiece which is necessary for the machining.

The worm-shaped tools which are used for the generative grinding process are usually significantly wider than the pure contact width which results from the contact between the tool and the workpiece. This is done for the purpose to use different shifting methods to grind the gears in a specific way: Firstly, the discontinuous shifting in the direction of the axis of the tool (Y axis) is employed between rough machining and finish machining and between the machining of single workpieces respectively to bring new fresh regions of the grinding worm into contact. With the continuous shifting in the direction of the axis of the tool (Y axis) during the grinding process of a workpiece (also designates as diagonal grinding) a specific influence of the tooth flank topology and/or surface structure can take place.

The cooling lubricant nozzles which are used here can be designed as fixed elements, i.e. they are optimized for a specific changeless workpiece diameter which is especially recommended for non-dressable CBN grinding tools which does not change their diameter. In the case of tools with changeable diameter, i.e. namely for dressable tools, the cooling lubricant nozzle can be installed in such a way that it is arranged movable in a plane which is perpendicular to the axis of the tool spindle, so that the cooling lubricant nozzle can be tracked correspondingly when the diameter of the tool decreases. This adjustment of the nozzle position to the actual tool diameter can take place by a rotatory or translational movement.

In the pre-known applications the workpiece is either machined only with a single tool (e.g. with a dressable grinding worm; the rough machining and the finish machining take place with different width regions of the same tool) or two tools of the same type and the same size are used (e.g. non-dressable profile grinding with CBN rough machining and finish machining wheels). In those cases the use of a single nozzle is possible without problems—with optimized properties for the used tool and method respectively.

Usually, a combination of several tools and machining methods of different kind respectively is used for the machining of several gears of the same workpiece in one clamping (e.g. gear box shafts) or for the machining of a gear with different methods for the rough machining and for the finish machining (e.g. rough machining by dressable generative grinding, finish machining by non-dressable profile grinding—as explained above).

In those cases the following variants of cooling lubricant supply are known:

It is known to use the same nozzle (with or without the above mentioned tracking in the case of changes of the diameter) for the different tools. Here it is the drawback that the conditions of the cooling lubricant supply cannot be optimized for each used tool. Therefore the machining with at least one of the used tools is possible only with reduced feed rate, so that longer machining times and thus a loss of efficiency result.

Furthermore, it is known that several nozzles are arranged on the slide of the Y axis which travel with the slide, wherein the nozzles do not change their position relatively to the respective tool. In this case the following drawbacks exist: To be able to use the above mentioned shifting process in the case of the generative grinding method with a worm-shaped tool the nozzle which travels with the slide of the Y axis must be as wide as the whole tool, i.e. thus significantly wider than it would be necessary due to the effective contact width between the tool and the workpiece. Given a constant exit height of the nozzle opening the cross sectional area of the nozzle increases when the nozzle becomes wider which is in conflict with the conditions which are ideal for the generative grinding. Also in this case the machining can take place only with a reduced feeding rate due to the non-optimal conditions of the cooling lubricant supply and thus the machining times are longer and the efficiency is reduced.

Thus, it is an object of the invention to further develop a hard finish machine of the kind mentioned above with respect to the cooling lubricant supply means so that the above mentioned drawbacks are avoided and that the use of all possible combinations of tools and methods can take place under optimized cooling lubricant supply conditions. It should become possible to adjust the respective conditions for the supply of cooling lubricant which have been found optimal for each type of tool and for each machining method. Furthermore, an automated adjusting of the conditions for the supply of cooling lubricant for a used tool and a used machining method respectively should become possible within a machining cycle without intervention by an operator, i.e. managed by the machine control.

The solution of this object by the invention is characterized in that the cooling lubricant supplying means comprise at least one nozzle element, wherein the nozzle element comprises a nozzle chamber, wherein the nozzle chamber is limited by two facing wall elements which define a stream exit opening for the cooling lubricant and wherein at least one of the wall elements is arranged movable for the variation of the stream exit opening.

Thereby, a wall element can be arranged pivotable around an axis at the nozzle element, which axis is parallel to the axis of the tool spindle.

Alternatively, it is possible that a part of the wall element is arranged translational movable in a direction at the nozzle element, which direction lies in the plane of a flat part of the wall element.

In both cases an actuator can be arranged which can move the pivotable wall element or the translational movable part of the wall element. The actuator can be designed as a pneumatic or hydraulic actuator element. Also possible is a design as an electrical actuator element.

According to an alternative solution the pivotable wall element or the translational movable part of the wall element can be kept—without being equipped with an actuator element—in an idle position, wherein the pivotable wall element or the translational movable part of the wall element can be moved out of the idle position by the flowing cooling lubricant. The pivotable wall element or the translational movable part of the wall element can be kept in the idle position by an elastic element according to a special embodiment. The elastic element can be e.g. a spring. The pivotable wall element or the translational movable part of the wall element can be biased by the elastic element against a stop. By doing so it is possible to influence the stream exit opening only by selecting the pressure and the volume flow rate respectively in the or through the nozzle element.

As a further development of this concept it can also be provided that for the adjustment of the wall element by the flowing cooling lubricant instead of the elastic element again a (pneumatical, hydraulical or electrical) actuator is engaged to hold the wall element in its idle position or to move it back into the same. In distinction to the firstly mentioned embodiment in this case the actuator must only art in one direction, i.e. it must only be able to either open or close.

The nozzle element can be movable arranged in a plane which is perpendicular to the axis of the tool spindle. By doing so it is possible to track the nozzle element to changes in the diameter of the tool which are caused by dressing to always ensure an optimal position of the nozzle element. The nozzle element can thereby be pivotable around an axis which is parallel to the axis of the tool spindle. It can also be translational movable in the plane which is perpendicular to the axis of the tool spindle.

The nozzle element can be arranged stationary in the direction of the axis of the tool spindle at or on the tool carrier. It can also be arranged movable on a linear guide in this direction relatively to the tool carrier. Furthermore, it is possible that the nozzle element is arranged stationary in the direction of the axis at or on the machine bed. Finally, it is possible that the nozzle element is arranged movable on a linear guide in the mentioned direction relatively to the machine bed.

The hard finish tools are gear machining tools according to a preferred embodiment of the invention, especially a grinding wheel or a grinding worm.

Thus, a nozzle element is proposed which is designed adjustable with respect to the stream exit opening for the cooling lubricant in an easy manner. The nozzle element has preferably a possibility for adjustment in a plane which is perpendicular to the axis of the tool spindle.

Beneficially, the above mentioned object is solved completely with the proposed solution. Accordingly, it becomes possible that also in the case of the use of very different hard finish tools, especially of grinding tools, the cooling lubricant supply conditions are optimized. The adjustment of the cooling lubricant supply means is possible in an easy manner automated by means of the machine control unit.

Consequently, solutions are proposed for the cooling lubricant supply for machining methods in which several tools are used one after the other in the same position relatively to the workpiece to be machined and wherein the requirements for the cooling lubricant supply (especially in terms of the exit cross sectional area, the exit speed, the volume flow rate and the pressure) differ significantly depending on the used tools and machining methods.

In the drawing embodiments of the invention are shown.

Figure 2:
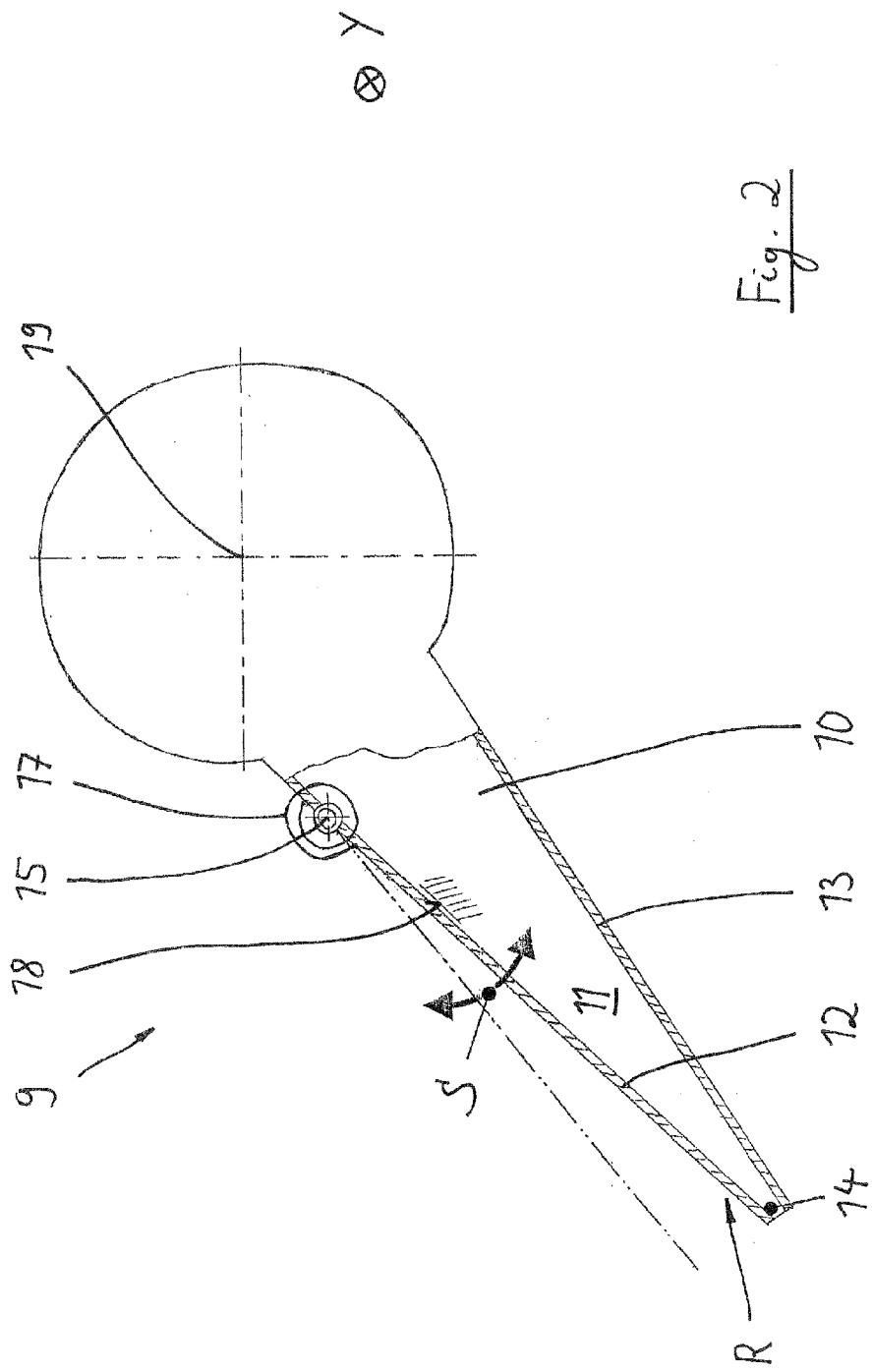
Figure 3:
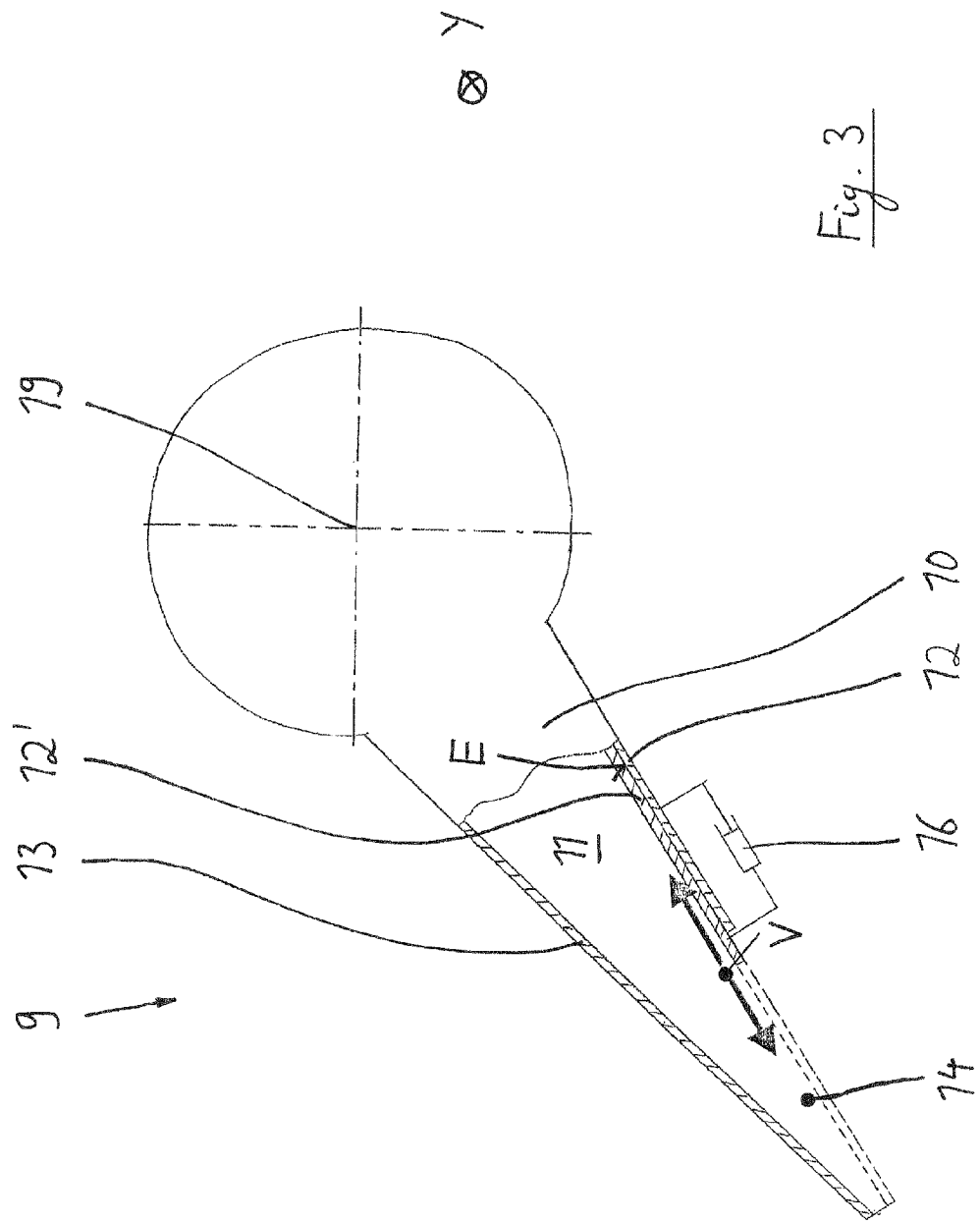

FIG. 1 shows in a perspective view a hard finish machine being designed as gear grinding machine, which has a grinding wheel and a grinding worm as grinding tools which are supplied with cooling lubricant by cooling lubricant supply means, FIG. 2 shows a first embodiment of the cooling lubricant supply means seen in the direction of the axis of the tool spindle (Y axis) equipped with a pivotable wall element of the nozzle body and FIG. 3 shows a second embodiment of the cooling lubricant supply means seen in the direction of the axis of the tool spindle (Y axis) equipped with a translational movable wall element of the nozzle body.

In FIG. 1 a hard finish machine 1 being a gear grinding machine is depicted which has a machine bed (machine base frame) 8. Inter alia, a tool carrier (slide) 7 is arranged linear movable on the same which bears a tool spindle 5. On the tool spindle 5 at least two hard finish tools 3, 4 are arranged, namely a profile grinding wheel 3 and a grinding worm 4 being depicted only schematically, wherein the tool spindle 5 can be designed as a one-part spindle or can consist of two or more separate spindles which can also be driven separately. The workpiece 2 which is to be machined with the tools 3, 4 is clamped on a workpiece spindle 20; presently, the workpiece axis is oriented vertically.

The tool spindle 5 has an axis 6. The tool spindle 5 can be moved in the direction of this axis on the tool carrier 7 in the marked direction Y to bring the tools 3, 4 selectively into engagement with the workpiece 2. Insofar, the gear grinding machine corresponds to the pre-known designs. The further necessary machine axes which are of course necessary for the machining are not further discussed as they are not relevant for the invention.

Relevant are now the cooling lubricant supply means 9 which serve for supplying cooling lubricant to the contact area between tool 3, 4 and workpiece 2.

According to the invention a nozzle element 10 is arranged as depicted in the two FIGS. 2 and 3 for two embodiments, wherein the nozzle element 10 comprises a nozzle chamber 11 which is limited by at least two facing wall elements 12 and 13. The two wall elements 12, 13 define a stream exit opening 14 for cooling lubricant. Thereby it is important that at least one of the wall elements 12, 13 is arranged movable for the variation of the stream exit opening 14.

In FIG. 2 it is provided that the wall element 13 is connected rigidly with the nozzle element 10. However, the facing wall element 12 is designed as a flat panel which is supported pivotable around an axis 15 at the nozzle element, wherein the axis 15 is parallel to the Y axis. Accordingly, the wall element 12 can pivot around the axis 15 so that the size of the stream exit opening 14 changes respectively. The direction of the swivelling is nominated with the double arrow S.

In this embodiment the swivelling movement is not caused by a separate actuator element. Rather, an elastic element 17 is operating at the axis 15 between the nozzle element 10 and the pivotable wall element 12. Here, the elastic element is designed as a torsion spring and causes that the wall element 12 is located in an idle position R when—as depicted—no outer forces act. Therefore, a stop 18 is provided at which the wall element 12 can rest; in the idle position R the slit-shaped stream exit opening 14 is minimal.

If now cooling lubricant flows through the nozzle chamber 11 a selective force can be exerted onto the inner side of the wall element 12 by the selection of the fluid pressure and the volume flow rate respectively of the cooling lubricant. Depending on the choice of the pressure and the volume flow rate respectively the wall element 12 swivels more or less against the force of the elastic element 17 out of the idle position R outwardly, until the wall element 12 reaches maximal the position shown with dashed-dotted line. Therewith the size of the slit of the stream exit opening 14 has widened to its maximum.

The advantage of the solution according to FIG. 2 is that the stream exit opening 14 can be varied only by the choice of the pressure and the volume flow rate respectively of the cooling lubricant; a separate adjustment element is not necessary (but possible).

The nozzle element 10 can be pivoted overall around the axis 19 to track changes in the diameter of the grinding tool caused by dressing.

In FIG. 3 an alternative solution is depicted in which the changing of the stream exit opening 14 is not adjusted by the pressure in the cooling lubricant but actively by an actuator.

Here, the upper wall element 13 of the nozzle element 10 which limits the nozzle chamber 11 is connected rigidly with the base body of the nozzle element. Such a rigid wall element 12 is also provided in the bottom region of the nozzle element 10. However, the lower limiting wall comprises a part 12' which is movable slide-like on the flat designed wall element 12 in the plane E formed thereby in a direction of displacement V according to the plotted double arrow. Depending on the position of the part 12' of the wall element the stream exit opening 14 changes its size. The position of the part 12' is adjusted by the actuator 16 which is depicted in FIG. 3 only very schematically. Pneumatical, hydraulical or electrical actuator means can be employed.

Also here the nozzle element 10 can pivot around the axis 19 to track changes in the diameter of the grinding tool caused by dressing.

As far as above an (absolute) stationary arrangement of the nozzle at or on the machine bed is mentioned the following should be noted: On the actual machine bed mostly a machine stand is (movably) arranged, wherein in turn a swivelling part is arranged (movably) on the machine stand. Then, e.g. a slide is arranged movably on a linear guide (for the Y axis) on the swivelling part.

The stationary arrangement of the nozzle at or on the machine bed has to be understood in that way that the nozzle is not moved during the intended use during the grinding process. Thus, this is also the case by definition if the nozzle—as it may be mostly the case—is fixed on the swivelling part and thus not directly fixed, but indirectly fixed via the swivelling part and the machine stand with the machine bed so that however the nozzle is arranged stationary relatively to the bed during the intended use (although it can be moved (adjusted) by the swivelling part and the machine stand relatively to the actual machine bed).

LIST OF REFERENCE NUMERALS

1 Hard Finish Machine
2 Workpiece
3 Hard Finish Tool (grinding wheel)
4 Hard Finish Tool (grinding worm)
5 Tool Spindle
6 Axis
7 Tool Carrier
8 Machine Bed (machine base frame)
9 Cooling Lubricant Supplying Means
10 Nozzle Element
11 Nozzle Chamber
12 Wall Element
12' Part of the Wall Element
13 Wall Element
14 Stream Exit Opening
15 Axis
16 Actuator
17 Elastic Element
18 Stop
19 Axis
20 Workpiece Spindle
Y Direction of the Axis of the Tool Spindle
V Direction of Displacement
S Direction of Rotation
E Plane
R Idle Position

The invention claimed is:

1. A hard finish machine for hard finishing of a workpiece, comprising:
    at least two different hard finish tools which are arranged on a tool spindle,
    the tool spindle is arranged movable in a direction of an axis of the tool spindle on a tool carrier,
    the tool carrier is translationally movable relative to a machine bed,
    a cooling lubricant supplying means for a supply of cooling lubricant to a machining region between the workpiece and the hard finish tools,
    the cooling lubricant supplying means comprise at least one nozzle element, the nozzle element comprises a nozzle chamber, the nozzle chamber is limited by two facing wall elements which define a stream exit opening for the cooling lubricant and at least one of the wall elements is arranged movable for a variation of the stream exit opening, either (1) one of the wall elements is pivotable around an axis at the nozzle element, which axis is parallel to the axis of the tool spindle, or (2) a part of one of the wall elements is translationally movable in a direction which lies in a plane of a flat part of the one of the wall elements, the one wall elements which is pivotable or the part of one of the wall elements which is translationally movable is kept in an idle position by an elastic element, and the one of the wall elements which is pivotable or the part of one of the wall elements which is translationally movable can be moved out of the idle position by flowing cooling lubricant.

2. The hard finish machine according to claim 1, further comprising an actuator which moves the one of the wall elements which is pivotable or the movable part of one of the wall elements which is translationally movable.

3. The hard finish machine according to claim 1, wherein the one of the wall elements which is pivotable or the part of one of the wall elements which is translationally movable is biased by the elastic element against a stop.

4. The hard finish machine according to claim 1, wherein the nozzle element is movably arranged in a plane which is perpendicular to the axis of the tool spindle.

5. The hard finish machine according to claim 4, wherein the nozzle element is pivotable around an axis which is parallel to the axis of the tool spindle.

6. The hard finish machine according to claim 4, wherein the nozzle element is translationally movable in the plane which is perpendicular to the axis of the tool spindle.

7. The hard finish machine according to claim 1, wherein the nozzle element is arranged stationary in the direction of the axis of the tool spindle at or on the tool carrier.

8. The hard finish machine according to claim 1, wherein the nozzle element is arranged movable on a linear guide in the direction (Y) of the axis of the tool spindle relatively to the tool carrier.

9. The hard finish machine according to claim 1, wherein the nozzle element is arranged stationary in the direction of the axis of the tool spindle at or on the machine bed.

10. The hard finish machine according to claim 1, wherein the nozzle element is arranged movable on a linear guide in the direction of the axis of the tool spindle relatively to the machine bed.

11. The hard finish machine according to claim 1, wherein the hard finish tools are gear machining tools.

12. The hard finish machine according to claim 11, wherein the hard finish tools are a grinding wheel or a grinding worm.

* * * * *

UNITED STATES PATENT AND TRADEMARK OFFICE
CERTIFICATE OF CORRECTION

PATENT NO. : 8,449,354 B2
APPLICATION NO. : 12/894435
DATED : May 28, 2013
INVENTOR(S) : Dremel et al.

It is certified that error appears in the above-identified patent and that said Letters Patent is hereby corrected as shown below:

On the title page item (73), should read:

Kapp GmbH, Coburg (DE)
Niles Werkzeugmaschinen GmbH, Berlin (DE)

Signed and Sealed this
Sixth Day of August, 2013

Teresa Stanek Rea
*Acting Director of the United States Patent and Trademark Office*